United States Patent
Chen et al.

(10) Patent No.: US 8,806,379 B2
(45) Date of Patent: Aug. 12, 2014

(54) METHOD AND SYSTEM FOR DISPLAYING GROUP RELATIONSHIPS IN A GRAPHICAL USER INTERFACE

(75) Inventors: Chun-Yi Chen, Belmont, CA (US); Aylin Uysal, Redwood City, CA (US); Sally Baggett, Healdsburg, CA (US); Lulit Bezuayehu, Oakland, CA (US); Aaron Joseph Green, San Francisco, CA (US); Julian Challenger, Reading (GB)

(73) Assignee: Oracle International Corporation, Redwood Shores, CA (US)

( * ) Notice: Subject to any disclaimer, the term of this patent is extended or adjusted under 35 U.S.C. 154(b) by 622 days.

(21) Appl. No.: 12/563,082

(22) Filed: Sep. 18, 2009

(65) Prior Publication Data

US 2011/0055755 A1    Mar. 3, 2011

Related U.S. Application Data

(60) Provisional application No. 61/239,036, filed on Sep. 1, 2009, provisional application No. 61/239,038, filed on Sep. 1, 2009.

(51) Int. Cl.
  *G06F 3/048*    (2013.01)
  *G06F 3/0481*   (2013.01)
  *G06F 3/0482*   (2013.01)
  *G06F 9/44*     (2006.01)

(52) U.S. Cl.
  CPC ........... *G06F 3/0481* (2013.01); *G06F 3/0482* (2013.01); *G06F 9/4446* (2013.01)
  USPC ........... 715/853; 715/708; 715/817; 715/841; 715/854

(58) Field of Classification Search
  CPC .... G06F 3/0481; G06F 3/0482; G06F 9/4446
  USPC ............... 715/807, 853, 854, 841, 817
  See application file for complete search history.

(56) References Cited

U.S. PATENT DOCUMENTS

| 5,798,769 A | 8/1998 | Chiu et al. |
| 5,850,221 A | 12/1998 | Macrae et al. |

(Continued)

FOREIGN PATENT DOCUMENTS

| WO | WO 2005/084285 A2 | 9/2005 |
| WO | WO 2007/111951 A2 | 10/2007 |
| WO | WO 2008/042677 A2 | 10/2008 |

OTHER PUBLICATIONS

"AA OrgChart Webpart." at URL: http://www.aasoftech.com/Products/OrgChartwebpart/Default.asp, downloaded Nov. 20, 2008; Copyright 1997-2007, AASoftech Inc, 1 page.

(Continued)

*Primary Examiner* — Tadeese Hailu
(74) *Attorney, Agent, or Firm* — Kilpatrick Townsend & Stockton LLP

(57) ABSTRACT

The present invention is directed to a method and system for providing a user interface representing organization hierarchy wherein a group of entities can be displayed as a node, and the node is displayed as a part of a hierarchical chart. In various embodiments, the present invention provides a graphical user interface displaying nodes that represent groups of entities, and the nodes are displayed as a part of a hierarchical chart based on the hierarchical relationship among the nodes that represent groups of entities. In various embodiments, a user is able to select actions for a group of entities displayed on the same node. Based on various criteria, nodes displaying one group of entities may, based on user selections of different grouping criteria, display a different group of entities. There are other features as well, in the graphical interface.

20 Claims, 9 Drawing Sheets

(56) References Cited

U.S. PATENT DOCUMENTS

| | | | |
|---|---|---|---|
| 5,937,163 | A | 8/1999 | Lee et al. |
| 5,953,724 | A | 9/1999 | Lowry |
| 6,128,617 | A | 10/2000 | Lowry |
| 6,154,750 | A | 11/2000 | Roberge et al. |
| 6,259,451 | B1 | 7/2001 | Tesler |
| 6,496,208 | B1 | 12/2002 | Bernhardt et al. |
| 6,732,114 | B1 | 5/2004 | Aamodt et al. |
| 6,816,175 | B1 | 11/2004 | Hamp et al. |
| 6,859,823 | B1 | 2/2005 | Nishihara et al. |
| 6,944,830 | B2 | 9/2005 | Card et al. |
| 6,990,638 | B2 | 1/2006 | Barksdale et al. |
| 7,080,077 | B2 | 7/2006 | Ramamurthy et al. |
| 7,131,069 | B1 | 10/2006 | Rush et al. |
| 7,149,959 | B1 | 12/2006 | Jones et al. |
| 7,152,207 | B1 | 12/2006 | Underwood et al. |
| 7,363,593 | B1 | 4/2008 | Loyens et al. |
| 7,412,647 | B2 | 8/2008 | Sellers et al. |
| 7,574,659 | B2 | 8/2009 | Szabo |
| 7,603,632 | B1 | 10/2009 | Aamodt et al. |
| 7,743,077 | B2 | 6/2010 | Gaurav |
| 7,802,174 | B2 | 9/2010 | Teng et al. |
| 8,161,413 | B2 | 4/2012 | Chen et al. |
| 8,190,710 | B2 | 5/2012 | Chen et al. |
| 8,205,171 | B2 | 6/2012 | Chen et al. |
| 2003/0218640 | A1 | 11/2003 | Noble-Thomas |
| 2004/0169688 | A1 | 9/2004 | Burdick et al. |
| 2004/0205594 | A1 | 10/2004 | Arora |
| 2004/0230917 | A1* | 11/2004 | Bales et al. .................. 715/854 |
| 2005/0050477 | A1 | 3/2005 | Robertson et al. |
| 2005/0071765 | A1 | 3/2005 | Hallisey et al. |
| 2005/0108260 | A1 | 5/2005 | Wenn et al. |
| 2005/0120005 | A1 | 6/2005 | Tesch et al. |
| 2005/0165766 | A1* | 7/2005 | Szabo .............................. 707/3 |
| 2005/0262192 | A1 | 11/2005 | Mamou et al. |
| 2006/0001647 | A1 | 1/2006 | Carroll |
| 2006/0150169 | A1* | 7/2006 | Cook et al. .................... 717/156 |
| 2006/0169688 | A1 | 8/2006 | Mori et al. |
| 2006/0195575 | A1 | 8/2006 | Delany et al. |
| 2007/0011316 | A1 | 1/2007 | Araki et al. |
| 2007/0100848 | A1 | 5/2007 | Vignet |
| 2007/0174160 | A1 | 7/2007 | Solberg et al. |
| 2007/0185904 | A1 | 8/2007 | Matsuzawa et al. |
| 2008/0028338 | A1 | 1/2008 | Kodosky et al. |
| 2008/0091441 | A1* | 4/2008 | Flammer et al. .................. 705/1 |
| 2008/0162616 | A1 | 7/2008 | Gross |
| 2009/0070337 | A1 | 3/2009 | Romem et al. |
| 2009/0113350 | A1* | 4/2009 | Hibino et al. .................. 715/853 |
| 2009/0144606 | A1 | 6/2009 | Vignet |
| 2009/0164946 | A1* | 6/2009 | Liddington .................... 715/853 |
| 2010/0287512 | A1* | 11/2010 | Gan et al. ....................... 715/854 |
| 2010/0325198 | A1 | 12/2010 | Chen et al. |
| 2010/0332582 | A1 | 12/2010 | Chen et al. |
| 2011/0055756 | A1 | 3/2011 | Chen et al. |
| 2011/0055767 | A1 | 3/2011 | Chen et al. |
| 2011/0055768 | A1 | 3/2011 | Chen et al. |
| 2011/0055771 | A1 | 3/2011 | Chen et al. |
| 2012/0174040 | A1 | 7/2012 | Chen et al. |

OTHER PUBLICATIONS

"Chapter 2: A Tutorial Introduction to Leo," at URL: http://webpages.charter.net.edramleo/intro.html#clones-views, downloaded Nov. 17, 2008, 4 pages.

U.S. Appl. No. 12/490,250, filed Jun. 23, 2009, Chen et al.

U.S. Appl. No. 12/492,084, filed Jun. 23, 2009, Chen et al.

U.S. Appl. No. 12/563,069, filed Sep. 18, 2009, Chen et al.

U.S. Appl. No. 12/563,071, filed Sep. 18, 2009, Chen et al.

U.S. Appl. No. 12/563,075, filed Sep. 18, 2009, Chen et al.

U.S. Appl. No. 12/563,085, filed Sep. 18, 2009, Chen et al.

"Create multiple Views with on one node with paging," Jan. 5, 2008, at URL: http://drupal.org/node/85720, downloaded Nov. 17, 2008, 3 pages.

"Different Context Menus depending on selected Node in Tree View-Xtreme Visual Basic Talk," at URL: http://www.xtremevbtalk.com/showthread.php?t=85288, downloaded Nov. 18, 2008, 3 pages.

Dill et al., "A Continuously Variable Zoom for Navigating Large Hierarchical Networks," at URL: http://ieeexplore.ieee.org/Xplore/login.jsp?url=/iel2/3184/9019/00399869.pdf?temp=x, 1994, 5 pages.

"Discussion Forum: Ittoolbox Groups Regarding to organization chart in asp.net" at URL: http://c.ittoolbox.com/groups/technical-functional/csharp-1/regarding-to-organization-chart-inaspnet-2191857, downloaded Nov. 20, 2008, Copyright 1998-2008, CEB Toolbox, Inc., 2 pages.

"Global View Mode," http://www.ilog.com/documentation/elixir10/en-US/Content/Visualization/Documentation/Elixir/_pubskel/ps_elixir82.html, downloaded Nov. 20, 2008; Copyright 1987-2008, ILOG S.A, 3 pages.

"Google Organizational Charts," Cogmap, at URL: http://www.cogmap.com/chart/google, downloaded Nov. 13, 2008, 5 pages.

"Grouping Data in a Report" at URL: http://msdn.microsoft.com/en-us/library/ms155903(SQL.90).aspx, downloaded Nov. 20, 2008, Copyright 2008, Microsoft Corporation, 2 pages.

"How to Draw Organizational Charts," EDrawsoft, at URL: http://www.edrawsoft.com/How-to-draw-org-charts.php, Copyright 2004-2008, EDrawSoft downloaded Nov. 13, 2008, 2 pages.

"Inaport Enterprise Data Integration for GoldMine," at URL: http://www.databridgenow.com/what_we_do/inaport.pdf, InaPlex Limited 2002, 6 pages.

"InfoPath Team Blog: recursive Controls support in Infopath," 2003 SP1 at URL: http://blogs.msdn.com/infopath/archive/2004/06/24/164988.aspx;copy, downloaded Dec. 15, 2008, Copyright 2008, Microsoft Corporation, 4 pages.

"Integrated Multi-Views," Journal of Visual Languages & Computing, Abstract, Jun. 1998, vol. 9, Issue 3, at URL: http://www.sciencedirect.com/science?_ob=ArticleURL&_udi=B6WMM-45J5BMSP&_user=10&rdoc=1&_fmt=&orig=search&_sort=d&view=c&_acct=C000050221&_version=1&_urlVersion=0&_userid=10&md5=b16ea573128ea20191cc62fa49df0c46, Copyright 1998, Academic Press, 2 pages.

"JSF portlet with JWL Data Tree Component," at URL: http://www.ibm.com/developerworks/forums/thread.jspa?threadID=161906, downloaded Nov. 18, 2008, 4 pages.

"KNIME Quick Start Guide," at URL: http://www.knime.org/quickstartguide.html, downloaded Nov. 17, 2008; Copyright 2003-2008, University of Konstanz, Germany,10 pages.

"KWizCom Organization Chart web part Installation & User Guide" Copyright 2005, KWizCom Ltd, pp. 1-22.

"McGill Organizational Chart" McGill Organizational Chart Manual-Version Aug. 2, 2005; 11 pages.

Nation et al., "Browse Hierarchical Data with the Degree of Interest Tree," at URL: http://www2.parc.com/istl/groups/uir/publications/items/UIR-2002-12-Nation-CH12002- DOIDemo.pdf, downloaded 2008, 2 pages.

"Organization Chart," at URL: http://www.aasoftech.com/Demo1/3LevelChart.htm, downloaded Feb. 2, 2011; 1 page.

"Organization charts from Office 2000 programs appear different in Office XP programs," at URL: http://support.microsoft.com/kb/293615, downloaded Nov. 20, 2008; Copyright 2008, Microsoft, 4 pages.

"Organization Chart" http://www.12manage.com/methods_organization_chart.html, downloaded Nov. 20, 2008, Copyright 2008 12manage, 3 pages.

"Organization Chart," at URL: http://www.longbowcg.com/home/services/downloads/coursewarevol2pdf.pdf, downloaded on or before Oct. 2010, 5 pages.

"OrgPlus Professional Tour: 7. Automatically format charts based on the data they contain" at URL: http://www.orgplus.com/products/orgplus-professional/orgplus-professional-tour.htm#, downloaded Nov. 17, 2008, 2000-2008, Copyright HumanConcepts. 1 page.

"OrgPlus Professional Tour: 6. Show chart data in multiple views" at URL:http://www.orgplus.com/products/orgplus-professional/orgplus-professional-tour.htm#, downloaded Nov. 20, 2008, Copyright 2000-2008, HumanConcepts, 1 page.

(56) References Cited

OTHER PUBLICATIONS

OrgPlus Professional Tour 5. Create multiple customized chart views to present employee data differently, at URL:http://www.orgplus.com/products/orgplus-professional/orgplusprofessional-tour.htm#, downloaded Nov. 20, 2008, 2000-2008, Copyright HumanConcepts, 2 pages.
"Org Chart Test" at URL: http://sandpit.reitsma.net.au/googleOrg/OrgChartTest.html; downloaded Dec. 15, 2008, 1 page.
Perkins, "Create and organizational chart with HTML, VML, and XML," downloaded Dec. 15, 200, 3 pages.
"1. Portal Tour-Chapter 2. User Guide," at URL: http://www.polarion.com/products/alm/help/ug_quicktour.html, downloaded Nov. 20, 2008; 9 pages.
Plumlee et al.," Zooming, Multiple Windows, and Visual Working Memory," at URL: http://ccom.unh.edu/vislab/PDFs/Zoom_Multi_VisualWM_final.pdf, 2008; 10 pages.
"Quixa Organisation Chart," at URL: http://www.quixa.com/bpmsuite/orgchart.asp, downloaded Nov. 20, 2008; Copyright 2008, Qiuxa Solutions, 1 page.
"QMF_V8-DB2 QMF Visionary Developer's Guide—Organization chart example," http://publib.boulder.ibm.com/infocenter/dzichelp/v2r2/index.jsp?topic=/com.ibm.qmf.doc.visd.d sqvdmst50.htm, downloaded Nov. 13, 2008, Copyright 1982, 2004, IBM Corporation 3 pages.
"Readerware views," at URL: http://www.readerware.com/help/rwViews.html, downloaded Nov. 20, 2008; Copyright 1999-2008, Readerware Corporation, 3 pages.
"Sage Abra OrgPlus Professional" Copyright 2007, Sage Software, 2 pages.
"Support Organization Chart" at URL: http://resources2.visual-paradigm.com/index.php/release-vp33/55-vp33/91-org-chart.pdf, Last updated Aug. 11, 2008, 5 pages.
Schaffer et al., at URL: "Navigating Hierarchically Clustered Networks Through Fisheye and Full-Zoom Methods," Fisheye versus Full Zoom Views, Mar. 24, 1998, pp. 1-20.
Stolte et al., "Multiscale Visualization Using Data Cubes," at URL: http://graphics.stanford.edu/papers/pan_zoom/paper.pdf, downloaded 2008, 8 pages.
TreeTable—Java applet combines grid and tree view, at URL: http://www.advancescripts.com/detailed/3201.html, downloaded Nov. 20, 2008; Copyright 2006, AdvanceScripts™, 2 pages.
"TreeView Nodes and ContextMenuStrip" at URL:http://www.devnewsgroups.net/group/microsoft.public.dotnet.framework.windowsforms/topic53850.aspx, downloaded Nov. 18, 2008, 5 pages.
"The Most Trusted Name in Enterprise Organizational Charting and Reporting," OrgPublisher, at URL:http://www.ilog.com/documentation/elixir10/enUS/Content/Visualization/Documentation/Elixir/_pubskel/ps_elixir82.html, downloaded Nov. 20, 2008, 2 pages.
"Understanding Data Graph Window Areas," at URL:http://docs.hp.com/en/B6454-97413/ch08s02.html, downloaded Nov. 18, 2008; Hewlett-Packard Development Company 2000, L.P, 3 pages.
"Welcome to Defura Infotech! Dynamic Org chart and Form Designer Tools," at URL:http://jayankv.com/OrgChartDetails.aspx, downloaded Nov. 13, 2008, Copyright 2007, Defure Infotech, 3 pages.
Zhao et al., "Elastic Hierarchies: Combining Treemaps and Node-Link Diagrams," at URL:http://www.dgp.toronto.edu/~sszhao/paperInforVis05_ElasticHierarchy.pdf, downloaded 2008, 8 pages.
OrgPublisher http://www.orgpublisher.com/docs/pdf/v8/OP8_datasheet.pdf, downloaded on or before Oct. 2010.
U.S. Appl. No. 12/563,069, filed Sep. 18, 2009, Notice of Allowance mailed Dec. 15, 2011, 9 pages.
U.S. Appl. No. 12/563,071, filed Sep. 18, 2009, Notice of Allowance mailed Mar. 8, 2012, 8 pages.
U.S. Appl. No. 12/563,075, filed Sep. 18, 2009, Office Action mailed Jan. 24, 2012, 13 pages.
U.S. Appl. No. 12/563,085, filed Sep. 18, 2009, Office Action mailed Jan. 26, 2012, 12 pages.
U.S. Appl. No. 12/490,250, filed Jun. 23, 2009, Notice of Allowance mailed Feb. 3, 2012, 8 pages.
U.S. Appl. No. 12/490,250, filed Jun. 23, 2009, Office Action mailed Sep. 28, 2011, 4 pages.
U.S. Appl. No. 12/490,250, filed Jun. 23, 2009, Office Action mailed Apr. 1, 2011, 8 pages.
U.S. Appl. No. 12/492,084, filed Jun. 25, 2009, Office Action mailed Feb. 13, 2012, 10 pages.
U.S. Appl. No. 12/563,075, filed Sep. 18, 2009, Final Office Action mailed May 25, 2012, 15 pages.
U.S. Appl. No. 12/563,085, filed Sep. 18, 2009, Advisory Action mailed Aug. 17, 2012, 5 pages.
U.S. Appl. No. 12/563,085, filed Sep. 18, 2009, Final Office Action mailed May 29, 2012, 13 pages.
U.S. Appl. No. 13/459,447, filed Apr. 30, 2012, Non-Final Office Action mailed Jun. 22, 2012, 9 pages.
U.S. Appl. No. 13/459,447, filed Apr. 30, 2012,Terminal Disclaimer—Approved mailed Sep. 28, 2012, 1 pages.
U.S. Appl. No. 13/459,447, filed Apr. 30, 2012, Notice of Allowance mailed Oct. 16, 2012, 29 pages.
U.S. Appl. No. 12/492,084, filed Jun. 25, 2009, Notice of Allowance mailed Aug. 2, 2012, 5 pages.

* cited by examiner

METHOD AND SYSTEM FOR DISPLAYING GROUP RELATIONSHIPS IN A GRAPHICAL USER INTERFACE

CROSS REFERENCES TO RELATED APPLICATIONS

The present application claims the benefit and priority under 35 U.S.C. 119(e) from the following U.S. Provisional Applications, the entire contents of which are herein incorporated by reference for all purposes:

(1) U.S. Provisional Application No. 61/239,038, filed Sep. 1, 2009, entitled METHOD AND SYSTEM FOR DISPLAYING GROUP RELATIONSHIPS IN A GRAPHICAL USER INTERFACE;

(2) U.S. Provisional Application No. 61/239,036, filed Sep. 1, 2009, entitled METHOD AND SYSTEM FOR PROVIDING GRAPHICAL USER INTERFACE WITH CONTEXTUAL VIEW;

The present application also incorporates by reference for all purposes the entire contents of U.S. application Ser. No. 12/563,075 filed Sep. 18, 2009, entitled METHOD AND SYSTEM FOR PROVIDING GRAPHICAL USER INTERFACE WITH CONTEXTUAL VIEW.

BACKGROUND OF THE INVENTION

The present invention is directed to a method and system for providing a user interface representing organization hierarchy wherein a group of entities can be displayed as a node, and the node is displayed as a part of a hierarchical chart.

In an information age, more and more data is being collected and stored every second. Satellites orbiting the earth record information and photograph our planet everyday, and they send this information and the photographs back to earth. Millions of computers on the Internet collect all types of information, ranging from network usage to marketing data. All types of organizations, large and small, store information such as personnel data, operational costs, etc. New tools are invented to make collecting data easier, faster, and more convenient than ever before.

Data, no matter how it is collected, is only meaningful and useful when organized and stored logically. For example, computers often rely on data structure to store data in predefined fields. For large amounts of data, people usually rely on databases, where structured collections of data and/or records are stored in computer systems in accordance to predefined rules and/or database models.

Relationship models, hierarchical models, and network models, are commonly used database models for representing relationships among records. Typically, databases rely on database software to organize and manage the data and/or records. For example, database software organizes and stores data and/or records using various types of database models.

Graphical user interface ("GUI") is a helpful tool for displaying data and showing the relationships thereof. Numerous conventional graphical interfaces are capable of displaying records from a database in a hierarchical view. For example, Oracle Corporation offers many software tools for displaying organization charts in a hierarchical view, the organization chart being a representation of data selected from a database.

While a GUI is useful in displaying information, it is often not enough. It is often useful and convenient if a user is able to interact with the information and see how the information can be grouped. In the past, various conventional techniques have been developed to allow users to interface with records displayed in a hierarchical chart, but they fail to allow users to see information displayed as groups in a hierarchical order.

Therefore, a new and improved graphical user interface is desired.

BRIEF SUMMARY OF THE INVENTION

The present invention is directed to a method and system for providing a user interface representing organization hierarchy wherein a group of entities can be displayed as a node, and the node is displayed as a part of a hierarchical chart. In various embodiments, the present invention provides a graphical user interface displaying nodes that represent groups of entities, and the nodes are displayed as a part of a hierarchical chart based on the hierarchical relationship among the nodes that represent groups of entities. In various embodiments, a user is able to select actions for a group of entities displayed on the same node. Based on various criteria, a node displaying one group of entities may, based on user selections of different grouping criteria, display a different group of entities. There are other features as well, in the graphical interface.

According to an embodiment, the present invention provides a computer-readable medium including codes executable by a computer processor. The computer-readable medium includes code for retrieving information associated with representations and relationship data for a plurality of entities, the information being stored in a memory, each of the entities being associated with one or more grouping attributes, the grouping attributes including a first grouping attribute, the relationship data being associated with one or more hierarchies. The computer-readable medium includes code for processing the information. The computer-readable medium includes code for providing a graphical user interface on a display, the display including a menu region and a display region. The computer-readable medium includes code for grouping the entities into a plurality of groups based at least on the first grouping attribute. The computer-readable medium includes code for storing grouping information. The computer-readable medium includes code for determining hierarchical relationships among the plurality of groups. The computer-readable medium includes code for storing the hierarchical relationships. The computer-readable medium includes code for generating a hierarchical chart, the hierarchical chart including a plurality of nodes, each of the nodes representing a group from the plurality of groups, the plurality of nodes being linked to one another on the hierarchical chart based on the hierarchical relationships, each of the nodes displaying one or more entities associated with a same group. The computer-readable medium includes code for rendering the hierarchical chart within the display region. The computer-readable medium includes code for receiving a user input. The computer-readable medium includes code for processing the user input.

According to another embodiment, the present invention provides a computer-readable medium including codes executable by a computer processor. The computer-readable medium includes code for retrieving information from a database, the database including representations and relationship data for a plurality of entities, each of the entities being associated with one or more grouping attributes, the grouping attributes including a first grouping attribute, the relationship data being associated with one or more hierarchies. The computer-readable medium includes code for processing the information from the database. The computer-readable medium includes code for providing a graphical user interface on a display, the display including a menu region and a display region. The computer-readable medium includes code for displaying the plurality of entities as a set of entity nodes on a first hierarchical chart within the display region, each entity node corresponding to an entity. The computer-readable medium includes code for receiving user input for grouping the nodes using at least the first grouping attribute. The computer-readable medium includes code for grouping the entities into a plurality of groups based at least on the first grouping attribute. The computer-readable medium includes code for storing a grouping information. The computer-readable medium includes code for determining hierarchical relationships among the plurality of groups. The computer-readable medium includes code for storing the hierarchical relationships. The computer-readable medium includes code for generating a second hierarchical chart, the hierarchical chart including a plurality of group nodes, each of the group nodes representing a group from the plurality of groups, the plurality of group nodes being linked to one another on the second hierarchical chart based on the hierarchical relationships, each of the group nodes displaying one or more entities associated with a same group. The computer-readable medium includes code for updating the display to display the second hierarchical chart.

According to yet another embodiment, the present invention provides a computer system for providing a graphical user interface. The system includes a processor module, the processor module being configured to process information from a database, the database including representations and relationship data for a plurality of entities, each of the entities being associated with one or more grouping attributes, the grouping attributes including a first grouping attribute, the relationship data being associated with one or more hierarchies, the processor module adapted to group the entities into a plurality of groups based at least on the first grouping attribute. The system includes a memory module being adapted to store the plurality of groups. The system includes a display module being adapted to display a hierarchical chart, the hierarchical chart including a plurality of nodes, each of the nodes corresponding to a group and displaying entities associated with the group. The system includes a user input module for receiving a user input.

DETAILED DESCRIPTION OF THE INVENTION

The present invention is directed to a method and system for providing a user interface representing organization hierarchy wherein a group of entities can be displayed as a node, and the node is displayed as a part of a hierarchical chart. In various embodiments, the present invention provides a graphical user interface displaying nodes that represent groups of entities, and the nodes are displayed as a part of a hierarchical chart based on the hierarchical relationship among the nodes that represent groups of entities. In various embodiments, a user is able to select actions for a group of entities displayed on the same node. Based on various criteria, a node displaying one group of entities may, based on user selections of different grouping criteria, display a different group of entities. There are other features as well, in the graphical interface.

Figure 1:
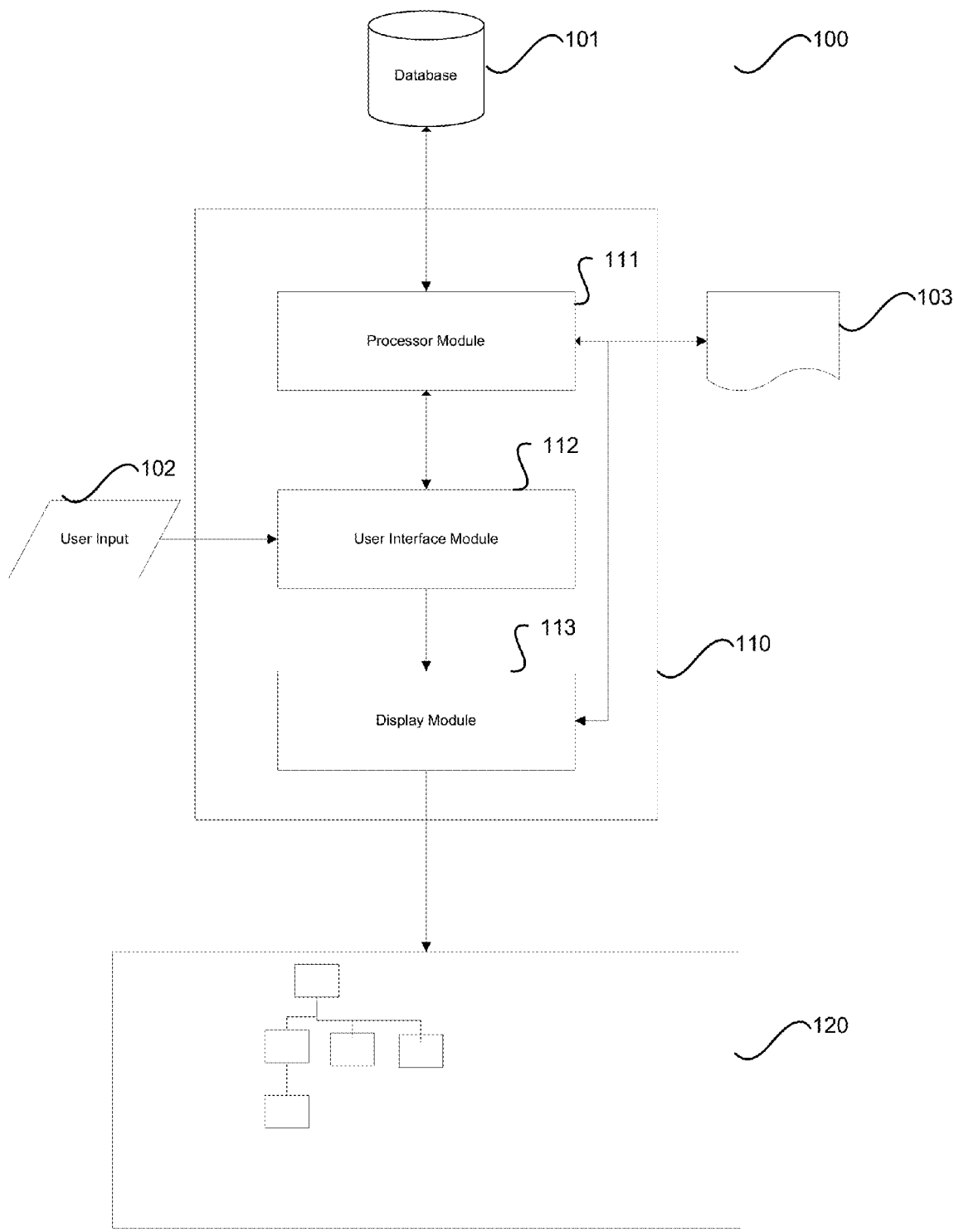
FIG. 1 is a simplified diagram illustrating data flow for processes according to embodiments of the present invention.

FIG. 1 is a simplified diagram illustrating data flow for processes according to embodiments of the present invention. This diagram is merely an example, which should not unduly limit the scope of the claims. One of ordinary skill in the art would recognize many variations, alternatives, and modifications.

As shown in FIG. 1, a system 100 the following components:
1. a database 101;
2. a processor module 111;
3. a user interface module 112;
4. a rendering module 113; and
5. a display 120.

As an example, processor module 111, user interface module 112, and rendering module 113 are parts of a controller module 110.

Database 101 is connected to controller module 110. Depending on the application, database 101 may implemented as structured data stored on a local memory device, such as hard disk, flash memory, etc. In one embodiment, database 101 is stored at a network location.

Among other features, database 101 stores data that represents various entities that are related to one another. Database 101 stores relationship data representing the relationship among these entities. Each of these entities may be associated with one or more attributes. In certain embodiments, one or more attributes are associated with grouping information. For example, an entity in database 101 represents a manager in a personnel database, and the manager has attributes that include name, address, salary, title, etc. The title of the manger is an attribute that is used as grouping information.

Processor module 111 is configured to provide information obtained from the database 101. For example, processor module 111 retrieves both entities data and relationship data mentioned above and processes these data. In various embodiments, processor module 111 determines grouping information for each of the entities in the database and stores the grouping information using the group information memory 103. For example, the processor module also sort entities into groups using one or more attributes.

Once processor module 111 processes the information from database 101, processor module 111 generates a hierarchical chart that is to be displayed on display 120. As shown in FIG. 1, processor module 111 sends the hierarchical chart to rendering module 113 for rendering on display 120. As shown in FIG. 1, display 120 is used to display the hierarchical chart. For example, the hierarchical chart includes a number of nodes and links. Each of the nodes represents a group of entities and/or concepts that are stored in the database. The links among the nodes represent the relationship among the nodes. When the hierarchical chart is displayed, the entities that are displayed in each node are based on the group information.

Controller module 110 as shown includes a user interface module 112 for receiving user inputs. When user input 102 is received, display 120 updates accordingly. For example, when user input 102 indicates that the grouping of the entities should be changed, the user input is received by user interface module 112 and processed by processor module 111. Processor module 111 updates the grouping of the entities and updates the group information memory 103, and retrieves additional information from the database if necessary. Processor module 111 then generates an updated hierarchical chart, on which a new set of groups or a subset of groups are displayed as nodes of the hierarchical chart. The updated hierarchical chart is then rendered by the rendering module 113 and then displayed at the display 120. The detailed operation of displaying and updating the hierarchical chart is described in more detail below.

In one embodiment, the entities displayed on the nodes are user selectable. For example, by selecting an entity on a node, a user is able to perform various actions, such as generating a new hierarchical chart that includes the selected node. In another embodiment, each node includes an action menu that allows a user to select actions that are common to the entries that are displayed on the same node (i.e., belonging to the same group).

Figure 2:
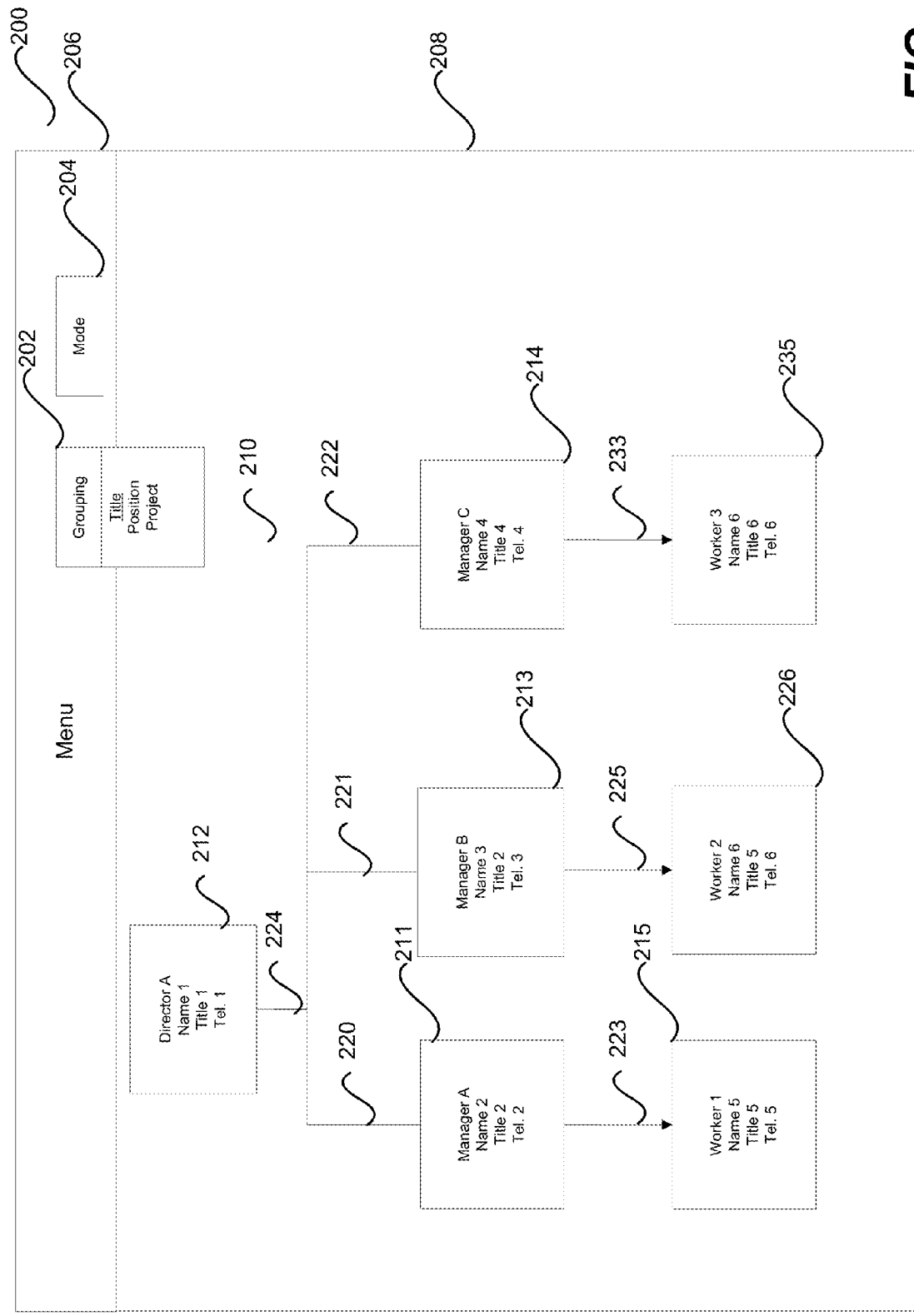
FIG. 2 is a simplified diagram illustrating a graphical user interface according to an embodiment of the present invention.

FIG. 2 is a simplified diagram illustrating a graphical user interface according to an embodiment of the present invention. This diagram is merely an example, which should not unduly limit the scope of the claims. One of ordinary skill in the art would recognize many variations, alternatives, and modifications.

GUI 200 is shown in FIG. 2. The GUI 200 is a graphical interface that contains a display region 208 and a menu region 206. The display region 208 displays a hierarchical chart 210. The menu region 206 typically comprises various user-selectable controls for performing various operations (not shown in FIG. 2) such as opening a file, copy and paste operations, etc. The operations may change depending on the specific application for which the GUI is displayed.

Display region 208 is used for displaying hierarchical information. For example, as depicted in FIG. 2, display region 208 displays a hierarchical chart 210 comprising a plurality of nodes 211, 212, 213, 214, 215, 226, and 235, and links 220, 221, 222, 223, 224, 225, and 233 connecting the nodes. Each node represents a concept or entity involved in the hierarchy depicted by chart 210. The links between the nodes represent hierarchical relationships between the concepts or entities represented by the nodes. For example, if chart 210 represents an organization personnel hierarchy, the nodes of hierarchical chart 210 may represent persons involved in the hierarchy and the links may represent hierarchical relationships between the personnel. For example, node 212 may represent a director, nodes 211, 213, and 214 may represent managers under the director, and node 215 may represent an employee under the manager represented by node 211. Each node may display information related to the entity or concept represented by the node. For example, the nodes in FIG. 2 may display names (e.g., Name 1, Name 2, etc.) corresponding to the people represented by the nodes. It is to be understood that other information items may be displayed as well.

According to embodiments, nodes 211, 212, 213, 214, 215, 226, and 235 in FIG. 2 correspond to entities stored in a database. The entities in the database relate to one another, and the relationship is stored in the database as relationship data. For example, links 220, 221, 222, 223, 224, 225, and 233 correspond to visualization on GUI 200 of the relationship data. To provide a more specific example, node 212 corresponds to the record of a director and the nodes 211, 213, and 14 correspond to the records of managers under the director, and the records for both director and managers stored in the data contain the hierarchical relationship information. In addition to relationship data, the database also contains various attributes associated with each entity. In one embodiment, each of the entities stored in the data contains various fields for storing various attributes. Going back to the example above, the record that stores information for the director may contain attributes such as name, address, contact information, salary, availability, performance, etc. Similarly, the records for managers may contain information such as name, address, contact information, salary, availability, performance, hours worked, vacation time, etc. Among other attributes, each of the entities includes attributes that can be used for grouping. For example, such attributes may include title and department in a personnel database.

As shown in FIG. 2, menu region 206 includes grouping menu 202. Grouping menu 202 provides a number of grouping criteria. For example, as shown in FIG. 2, the grouping criteria includes "Title," "Position," and "Project" that are based on the attributes associated with the nodes. In a specific embodiment, the grouping criteria as shown are predefined. In one embodiment, grouping criteria shown in grouping menu 202 are automatically determined by a computer program. For example, the computer program processes each of the records to determine their attributes and automatically generates the grouping criteria based on the records and/or attributes. Depending on the application, there may be various ways for grouping nodes. For example, the hierarchical relationship as shown in FIG. 2 is one way for grouping nodes. That is, nodes are organized according to the positional hierarchy. In various embodiments, nodes are grouped together based on various criteria. For example, the criteria for grouping may include title, position, and project, as shown in menu 202.

Figure 3A:
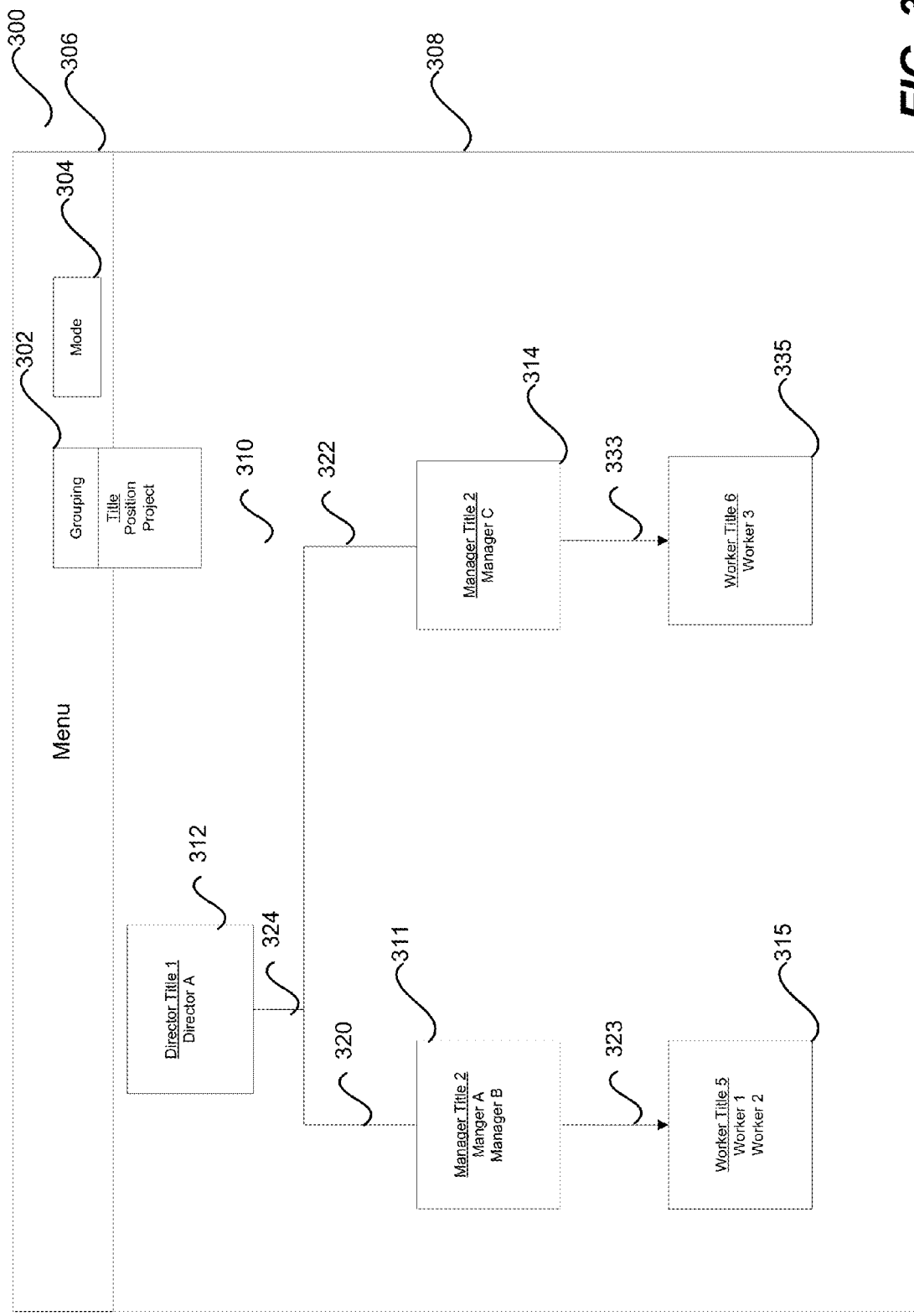
FIGS. 3A-3B are simplified diagrams illustrating grouping of nodes using title as criteria according to an embodiment of the present invention.
Figure 3B:
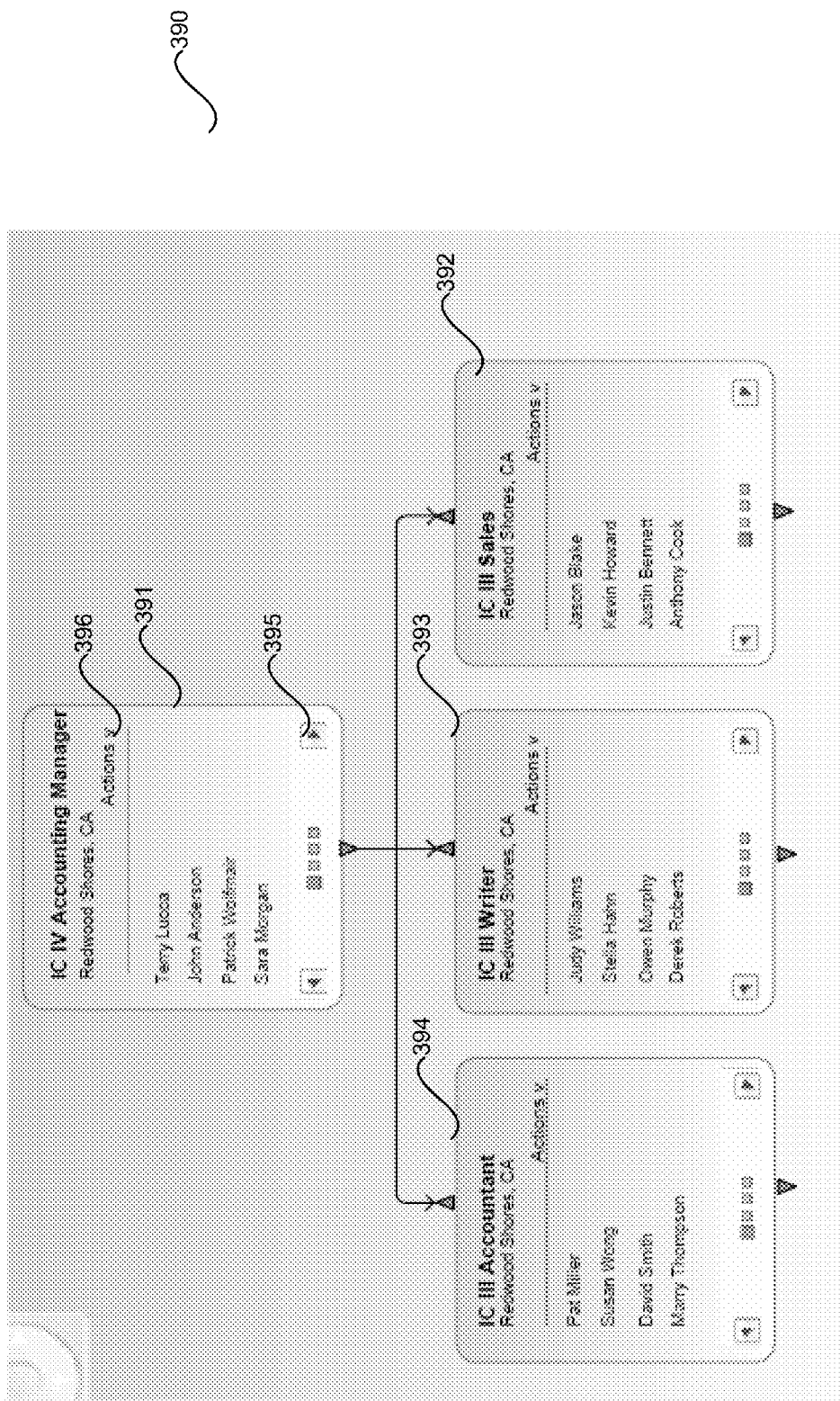

FIGS. 3A-3B are simplified diagrams illustrating grouping of nodes using title as the criteria according to an embodiment of the present invention. There diagrams merely provide an example, which should not unduly limit the scope of the claims. One of ordinary skill in the art would recognize many variations, alternatives, and modifications. As shown in FIG. 3A, nodes are grouped and shown in the hierarchical chart based on their titles. For example, the menu item "title" is selected at menu 302. As a result of this selection, nodes of hierarchical chart 310 are grouped together based on the title. For example, "Manager A" and "Manager B," which were individual nodes, are now displayed together as node 311, since "Manager A" and "Manager B" both have the title of "Manager Title 2." As shown in FIG. 2, "Worker 1" was a node subsidiary to "Manager A" and "Worker 2" was a node subsidiary to "Manager B." As a result of grouping, "Worker 1" and "Worker 2" are displayed together as node 315, and node 315 is subsidiary to the node 311, which reflects the earlier hierarchical relationship: "Worker 1" was a node subsidiary to "Manager A" and "Worker 2" was a node subsidiary to "Manager B."

As shown, hierarchical chart 310 retains the hierarchical relationship after grouping. The managers are subsidiary to Director A, and they remain subsidiary to Director A after grouping. Similarly, workers who are subsidiary to managers remain subsidiary to the managers. It is to be appreciated that embodiments of the present invention allows grouping of nodes while preserving hierarchical relationships as displayed.

FIG. 3B provides a screen shot 390 for hierarchical chart 310. As shown, node 391 represents IV Accounting Managers. On node 391, action menu 396 is provided, which allows the user to perform actions that are common the to groups of entities (e.g., sending email to all entities in the group shown in node 391). In addition, view selection menu 395 is provided on node 391 to allow users to view additional entities of the group and/or additional information related to the group. In hierarchical chart 390, nodes 392, 393, and 394 represent different types of workers (accountant in node 394, writer in node 393, and sales in node 392), and these workers are under the account managers. In various embodiments, a user is able to expand the hierarchical chart upon selecting one or more nodes.

Figure 4:
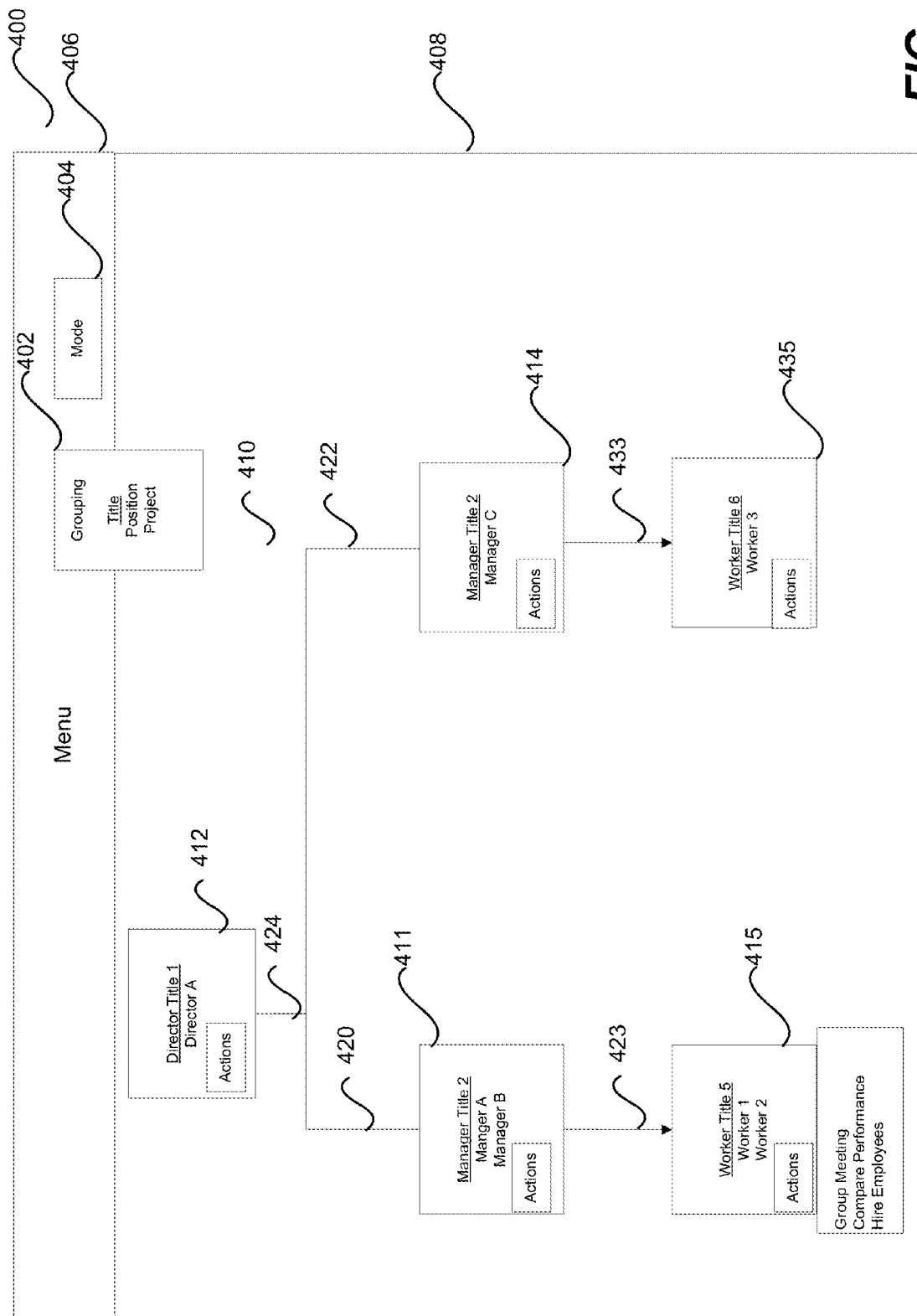
FIG. 4 is a simplified diagram illustrating an action menu provided on nodes according to embodiments of the present invention.

As mentioned above, action menus are provided on each node. FIG. 4 is a simplified diagram illustrating an action menu provided on nodes according to embodiments of the present invention. This diagram is merely an example, which should not unduly limit the scope of the claims. One of ordinary skill in the art would recognize many variations, alternatives, and modifications. As shown in FIG. 4, hierarchical chart 410 includes a plurality of nodes. Each of the nodes represents a group of entities. For example, node 412 represents the Director group. Similarly, nodes 414 and 411 represent two different manager groups. Each of the nodes includes an action menu. An action menu includes menu selections that are commonly available to entities displayed on a node. As an example, node 415 has an action menu that includes actions "Group Meeting," "Compare Performance," and "Hire Employees," all of which are common to the worker. More particularly, the action menu may include actions that are only available for a group (e.g., compare performance).

Figure 5:
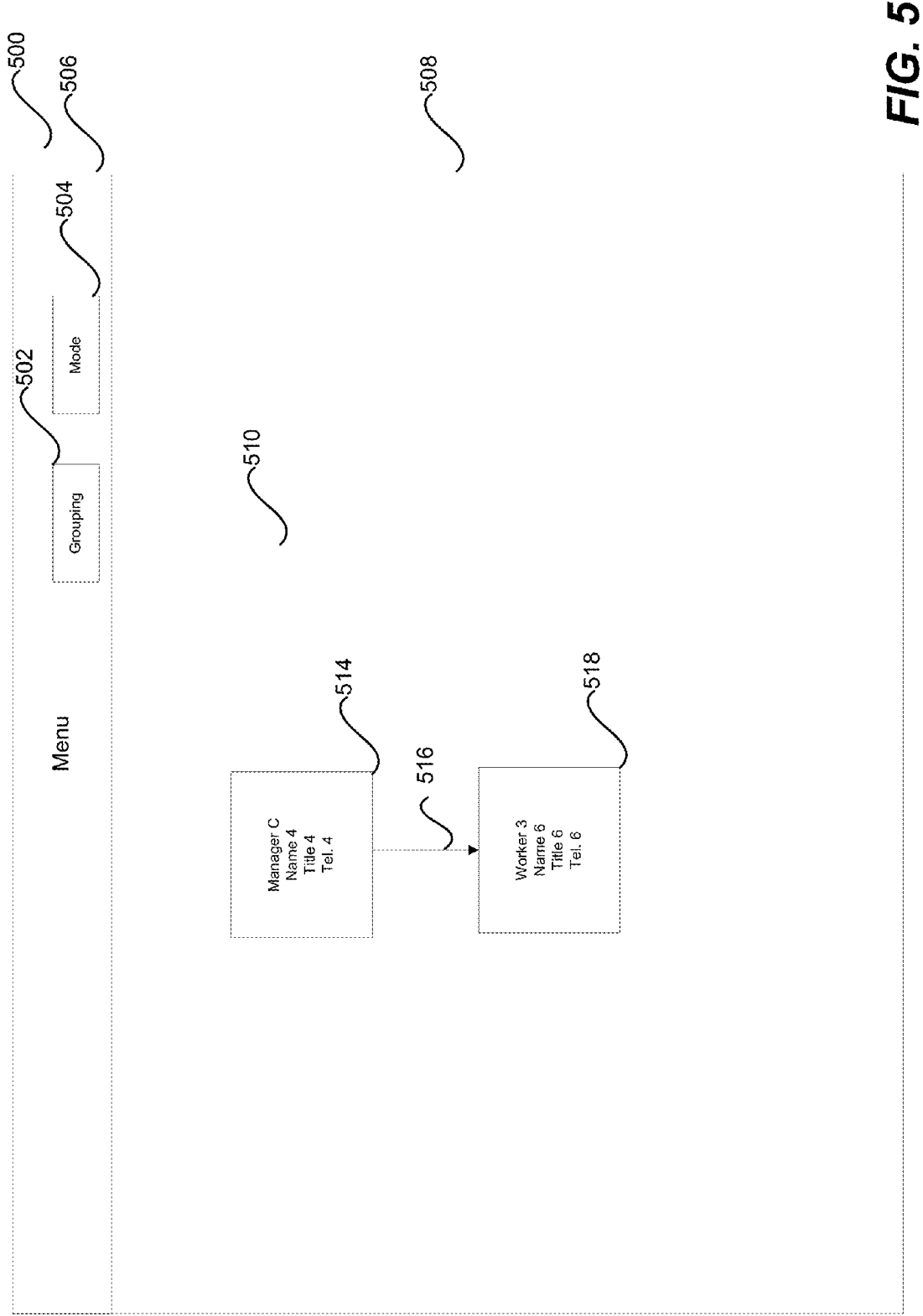
FIG. 5 is a simplified diagram illustrating a partial hierarchical chart 510 according to embodiments of the present invention.

A user is able to expand the hierarchical chart upon selecting one or more nodes. FIG. 5 is a simplified diagram illustrating a partial hierarchical chart 510 according to embodiments of the present invention. This diagram is merely an example, which should not unduly limit the scope of the claims. One of ordinary skill in the art would recognize many variations, alternatives, and modifications.

As explained above, the various entities can be displayed as a group in the same nodes, and various aspects of hierarchical relationships among the entities are preserved. In one embodiment, the present invention allows users to select a single entity on a hierarchical chart, and as a result of the user selection (e.g., a click on the entity), a new hierarchical chart showing entities and/or nodes related to a user selected node. As shown in FIG. 5, the entity "Manager C" is selected by user. As a result of this selection, "Manager C" is displayed as an individual node. The entity "Worker 3" is subsidiary to "Manager C" and thus is displayed as node 518 below node 514, and their relationship is indicated by link 516. For example, hierarchical chart 510 is a subset of hierarchical chart 410, and the nodes of hierarchical chart 510 are based on nodes 414 and 435 of hierarchical chart 410. Among other things, the display of selected nodes as a subset on the display allows users to better view information and hierarchical relationships among the selected nodes. As shown in FIG. 5, the nodes on hierarchical chart 510 display more detailed information for the entities than when displayed as groups.

Figure 6:
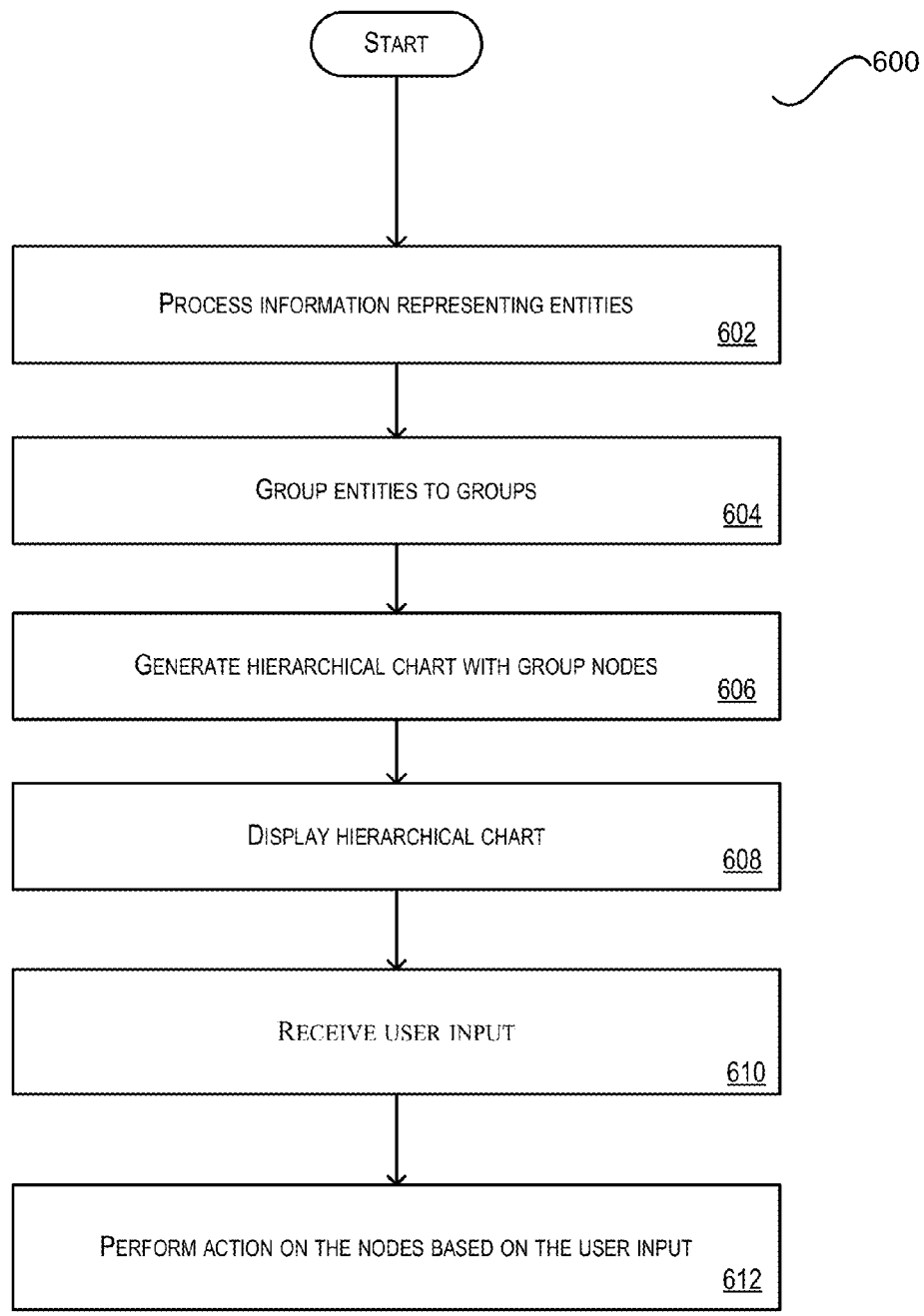
FIG. 6 is a simplified flow diagram illustrating a process for displaying a hierarchical chart according to embodiments of the present invention.

FIG. 6 is a simplified flow diagram illustrating a process for displaying hierarchical chart according to embodiments of the present invention. This diagram is merely an example, which should not unduly limit the scope of the claims. One of ordinary skill in the art would recognize many variations, alternatives, and modifications. For example, various steps may be added, removed, repeated, replaced, modified, rearranged, and/or overlapped.

At step 602, information representing entities and relationships thereof is retrieved from memory and processed. As an example, information representing entities is stored in a memory, and the entities share hierarchical relationships with one another. In processing the information, the relationship among the entities is determined.

At step 604, entities are grouped. For example, the grouping of entities may be based on one or more attributes of the entities, such as title, location, projects, etc., as explained above. During the process of grouping the entities, entities that share grouping criteria are grouped together for display as a single node. Hierarchical relationships among the groups are determined.

At step 606, a hierarchical chart with group nodes is generated. The hierarchical chart shown in FIG. 4 is an example. Each of the group nodes represents one or more entities that fit into the same grouping criteria, and the nodes are linked to one another based on the hierarchical relationship among the groups.

At step 608, the hierarchical chart is displayed. The hierarchical chart shown in FIG. 4 is an example. The hierarchical chart displays, among other features, nodes that represents a group of entities. In addition, nodes may also include action items associated with the groups of entities they represent.

At step 610, user input is received. Depending on the application, user input may include selection of one or more entities and/or actions on a node. The user input is processed to determine what action is to be performed.

At step 612, one or more actions are performed on the node based on the user input. For example, the actions may be node/group specific actions (e.g., comparing entities of a node). As another example, the actions may also include updating the nodes that are being displayed (e.g., displaying a selected nodes and related nodes thereof as a separate hierarchical chart). Other actions may be performed as well.

Figure 7:
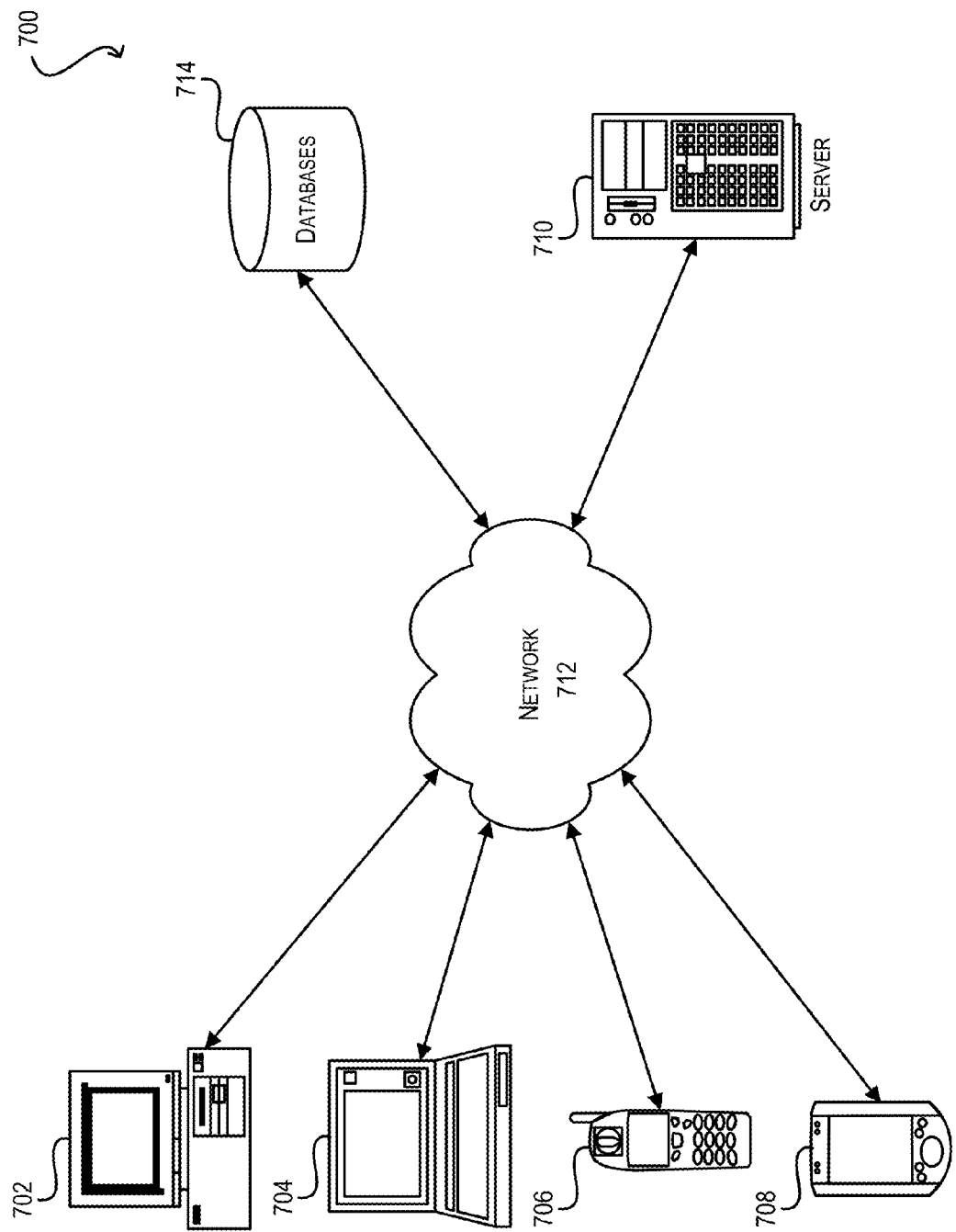
FIG. 7 is a simplified block diagram illustrating the physical components of a system environment 700 that may be used in accordance with an embodiment of the present invention.

FIG. 7 is a simplified block diagram illustrating the physical components of system environment 700 that may be used in accordance with an embodiment of the present invention. This diagram is merely an example, which should not unduly limit the scope of the claims. One of ordinary skill in the art would recognize many variations, alternatives, and modifications.

As shown, system environment 700 includes one or more client computing devices 702, 704, 706, and 708 communicatively coupled with a server computer 710 via a network 712. In one set of embodiments, client computing devices 702, 704, 706, and 708 may be configured to run one or more components of a graphical interface described above.

Client computing devices 702, 704, 706, and 708 may be general purpose personal computers (including, for example, personal computers and/or laptop computers running various versions of Microsoft Windows™ and/or Apple Macintosh™ operating systems), cell phones or PDAs (running software such as Microsoft Windows Mobile™ and being Internet, e-mail, SMS, Blackberry™, and/or other communication protocol enabled), and/or workstation computers running any of a variety of commercially-available UNIX™ or UNIX™-like operating systems (including without limitation the variety of GNU/Linux™ operating systems). Alternatively, client computing devices 702, 704, 706, and 708 may be any other electronic device capable of communicating over a network (e.g., network 712 described below) with server computer 710. Although system environment 700 is shown with four client computing devices and one server computer, any number of client computing devices and server computers may be supported.

Server computer 710 may be a general purpose computer, specialized server computer (including, e.g., a LINUX™ server, UNIX™ server, mid-range server, mainframe computer, rack-mounted server, etc.), server farm, server cluster, or any other appropriate arrangement and/or combination. Server computer 710 may run an operating system including any of those discussed above, as well as any commercially available server operating system. Server computer 710 may also run any of a variety of server applications and/or mid-tier applications, including web servers, Java virtual machines, application servers, database servers, and the like. In various embodiments, server computer 710 is adapted to run one or more Web services or software applications described in the foregoing disclosure. For example, server computer 710 may provide the abovementioned graphical user interface and functionalities thereof.

As shown, client computing devices 702, 704, 706, and 708 and server computer 710 are communicatively coupled via network 712. Network 712 may be any type of network that can support data communications using any of a variety of commercially-available protocols, including without limitation TCP/IP, SNA, IPX, AppleTalk™, and the like. Merely by way of example, network 712 may be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth™ protocol known in the art, and/or any other wireless protocol); and/or any combination of these and/or other networks. In various embodiments, client computing devices 702, 704, 706, and 708 and server computer 710 are able to access the database 714 through the network 712. In certain embodiments, client computing devices 702, 704, 706, and 708 and server computer 710 each has its own database.

System environment 700 may also include one or more databases 714. Database 714 may correspond to an instance of integration repository as well as any other type of database or data storage component described in this disclosure. Database 714 may reside in a variety of locations. By way of example, database 714 may reside on a storage medium local to (and/or resident in) one or more of client computing devices 702, 704, 706, and 708, 710. Alternatively, database 714 may be remote from any or all of client computing devices 702, 704, 706, and 708, and server computer 710 and/or in communication (e.g., via network 712) with one or more of these. In one set of embodiments, database 714 may reside in a storage-area network (SAN) familiar to those skilled in the art. Similarly, any necessary files for performing the functions attributed to client computing devices 702, 704, 706, and 708, and server computer 710 may be stored locally on the respective computer and/or remotely on database 714, as appropriate. In one set of embodiments, database 714 is a relational database, such as Oracle 10 g™ available from Oracle Corporation that is adapted to store, update, and retrieve data in response to SQL-formatted commands. In various embodiments, database 714 stores data that are displayed as hierarchical charts shown in FIGS. 2-5.

Figure 8:
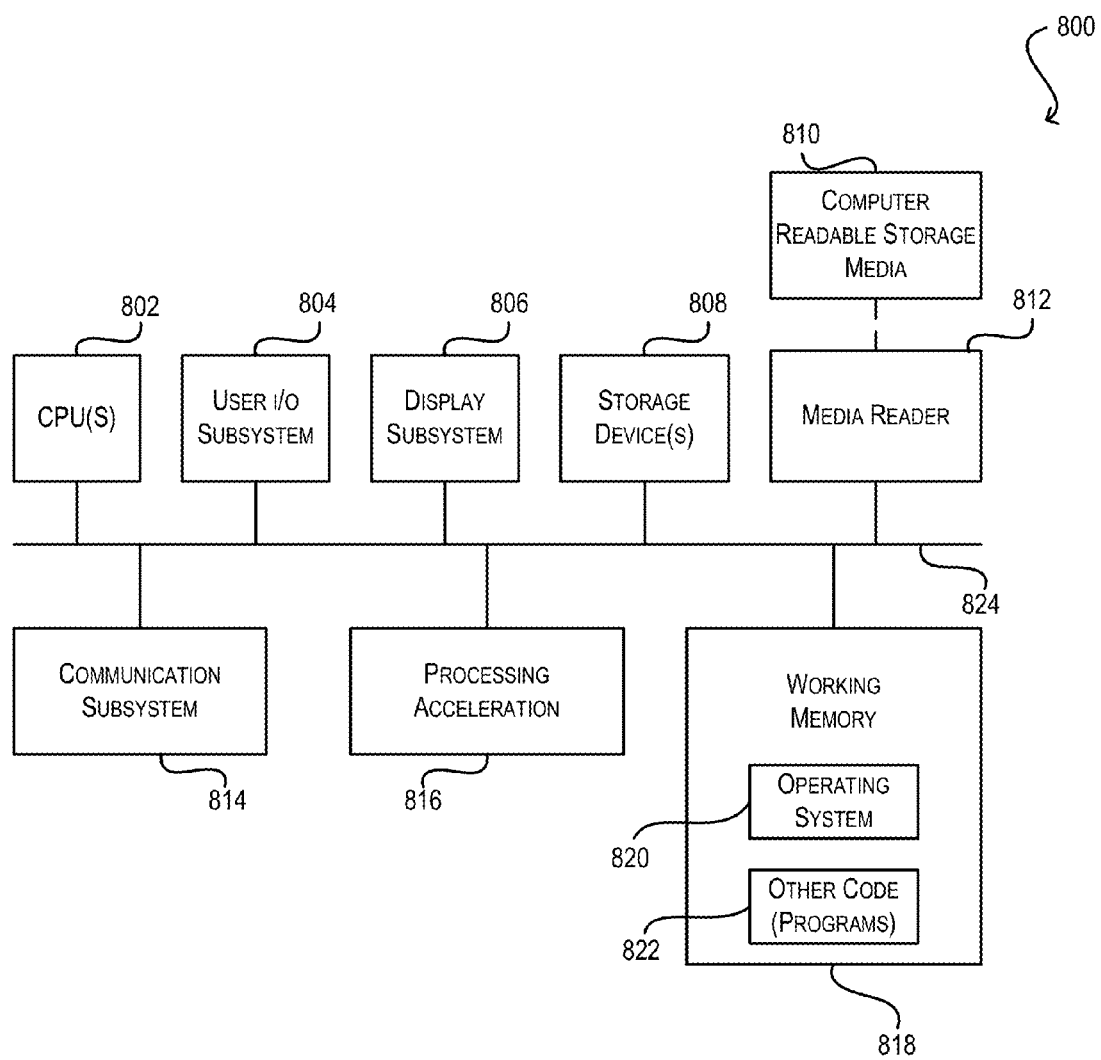
FIG. 8 is a simplified block diagram illustrating the physical components of a computer system 800 that may be used in accordance with an embodiment of the present invention.

FIG. 8 is a simplified block diagram illustrating the physical components of computer system 800 that may be used in accordance with an embodiment of the present invention. This diagram is merely an example, which should not unduly limit the scope of the claims. One of ordinary skill in the art would recognize many variations, alternatives, and modifications.

In various embodiments, computer system 800 may be used to implement any of client computing devices 702, 704, 706, and 708, and server computer 710 illustrated in system environment 700 described above. As shown in FIG. 8, computer system 800 comprises hardware elements that may be electrically coupled via bus 824. The hardware elements may include one or more central processing units (CPUs) 802, one or more input devices 804 (e.g., a mouse, a keyboard, etc.), and one or more output devices 806 (e.g., a display device, a printer, etc.). For example, input devices 804 are used to receive user input for interacting with the GUIs illustrated in FIGS. 2-5. Computer system 800 may also include one or more storage devices 808. By way of example, storage devices 808 may include devices such as disk drives, optical storage devices, and solid-state storage devices such as a random access memory (RAM) and/or a read-only memory (ROM), which can be programmable, flash-updateable and/or the like. In an embodiment, various databases are stored in the storage devices 808. For example, the processing units 802 are configured to retrieve data from database process the data for displaying on a GUI.

Computer system 800 may additionally include a computer-readable storage media reader 812, a communications subsystem 814 (e.g., a modem, a network card (wireless or wired), an infra-red communication device, etc.), and working memory 818, which may include RAM and ROM devices as described above. In some embodiments, computer system 800 may also include a processing acceleration unit 816, which can include a digital signal processor (DSP), a special-purpose processor, and/or the like.

Computer-readable storage media reader 812 can further be connected to a computer-readable storage medium 810, together (and, optionally, in combination with storage devices 808) comprehensively representing remote, local, fixed, and/or removable storage devices plus storage media for temporarily and/or more permanently containing computer-readable information. Communications subsystem 814 may permit data to be exchanged with network 712 of FIG. 7 and/or any other computer described above with respect to system environment 700.

Computer system 800 may also comprise software elements, shown as being currently located within working memory 818, including an operating system 820 and/or other code 822, such as an application program (which may be a client application, Web browser, mid-tier application, RDBMS, etc.). In a particular embodiment, working memory 818 may include executable code and associated data structures for one or more of the design-time or runtime components/services illustrated in FIGS. 2 and 4. It should be appreciated that alternative embodiments of computer system 800 may have numerous variations from that described above. For example, customized hardware might also be used and/or particular elements might be implemented in hardware, software (including portable software, such as Applets™), or both. Further, connection to other computing devices such as network input/output devices may be employed. In various embodiments, the behavior of the zoom functions described throughout the present application is implemented as software elements of computer system 800.

In one set of embodiments, the techniques described herein may be implemented as program code executable by a computer system (such as computer system 800) and may be stored on machine-readable media. Machine-readable media may include any appropriate media known or used in the art, including storage media and communication media, such as (but not limited to) volatile and non-volatile, removable and non-removable media implemented in any method or technology for storage and/or transmission of information such as machine-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store or transmit the desired information and which can be accessed by a computer.

Although specific embodiments of the present invention have been described, various modifications, alterations, alternative constructions, and equivalents are within the scope of the invention. Further, while embodiments of the present invention have been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A non-transitory computer-readable medium including codes executable by a computer processor, the computer-readable medium comprising:
   code for retrieving information associated with representations and relationship data for a plurality of entities, the information being stored in a memory, each of the entities being associated with one or more grouping attributes, the grouping attributes including a first grouping attribute, the relationship data being associated with one or more hierarchies;
   code for processing the information;
   code for providing a graphical user interface on a display, the display including a menu region and a display region;
   code for grouping the entities into a plurality of groups based at least on the first grouping attribute;
   code for storing a grouping information;
   code for determining hierarchical relationships among the plurality of groups;
   code for storing the hierarchical relationships;
   code for generating a hierarchical chart, the hierarchical chart including a plurality of nodes, each of the nodes representing a group from the plurality of groups, the plurality of nodes being linked to one another on the hierarchical chart based on the hierarchical relationships, each of the nodes displaying one or more entities associated with a same group;
   code for receiving a selection of at least one node in the hierarchical chart;
   code for displaying nodes in the hierarchical chart related to the at least one node, wherein the related nodes are configured to provide a selection menu of actions that are uniquely associated with at least one node, wherein the actions include updating the nodes that are being displayed;
   code for rendering the hierarchical chart within the display region;
   code for receiving a user input, wherein the user input includes selecting one or more nodes from the updated nodes being displayed, and wherein the user input further includes designating one or more related nodes to the one or more selected nodes;
   code for processing the user input; and
   code for displaying the one or more selected nodes and the one or more related nodes as a separate hierarchal chart.

2. The non-transitory computer-readable medium of claim 1 wherein each of the nodes comprises an action menu.

3. The non-transitory computer-readable medium of claim 1 wherein each of the entities on display on the node is selectable in response to user input.

4. The non-transitory computer-readable medium of claim 1 further comprising code for performing one or more actions for entities of a same node.

5. The non-transitory computer-readable medium of claim 1 further comprising code for updating information of the database for entities of a same group in response to one or more user inputs.

6. The non-transitory computer-readable medium of claim 1 further comprising code for defining a display size for each of the nodes, the display size being optimized for fitting the display region.

7. The non-transitory computer-readable medium of claim 1 further comprising code for generating a menu at the menu region for selecting one or more criteria for grouping the entities.

8. A non-transitory computer-readable medium including codes executable by a computer processor, the computer-readable medium comprising:
   code for retrieving information from a database, the database including representations and relationship data for a plurality of entities, each of the entities being associated with one or more grouping attributes, the grouping attributes including a first grouping attribute, the relationship data being associated with one or more hierarchies;
   code for processing the information from the database;
   code for providing a graphical user interface on a display, the display including a menu region and a display region;
   code for displaying the plurality of entities as a set of entity nodes on a first hierarchical chart within the display region, each entity node corresponding to an entity;
   code for receiving user input for grouping the nodes using least the first grouping attribute;
   code for grouping the entities into a plurality of groups based at least on the first grouping attribute;
   code for storing a grouping information;
   code for determining hierarchical relationships among the plurality of groups;
   code for storing the hierarchical relationships;
   code for generating a second hierarchical chart, the hierarchical chart including a plurality of group nodes, each of the group nodes representing a group from the plurality of groups, the plurality of group nodes being linked to one another on the second hierarchical chart based on the hierarchical relationships, each of the group nodes displaying one or more entities associated with a same group;

code for receiving a selection of at least one node in the hierarchical chart;

code for displaying nodes in the hierarchical chart related to the at least one node, wherein the related nodes are configured to provide a selection menu of actions that are uniquely associated with at least one node, wherein the actions include updating the nodes that are being displayed;

code for updating the display to display the second hierarchical chart;

code for receiving a user input, wherein the user input includes selecting one or more nodes from the updated nodes being displayed, and wherein the user input further includes designating one or more related nodes to the one or more selected nodes;

code for processing the user input; and code for displaying the one or more selected nodes and the one or more related nodes as a separate hierarchal chart.

9. The non-transitory computer-readable medium of claim 8 further comprising:

code for processing a user input selecting an entry from a group node on the second hierarchical chart;

code for determining a subset of entries being related to the selected entry;

code for generating a third hierarchical chart based on the subset of entries;

code for rendering the third hierarchical chart.

10. The non-transitory computer-readable medium of claim 8 wherein the database is on a network source.

11. The non-transitory computer-readable medium of claim 8 further comprising code for determining a display size for the first hierarchical chart.

12. The non-transitory computer-readable medium of claim 8 further comprising code for generating the plurality of groups based on the first grouping attribute.

13. The non-transitory computer-readable medium of claim 8 further comprising code for generating a set of action for each of the groups.

14. A computer system for providing a graphical user interface, the system comprising:

a processor module, the processor module being configured to process information from a database, the database including representations and relationship data for a plurality of entities, each of the entities being associated with one or more grouping attributes, the grouping attributes including a first grouping attribute, the relationship data being associated with one or more hierarchies, the processor module adapted to group the entities into a plurality of groups based at least on the first grouping attribute;

a memory module being adapted to store the plurality of groups;

a display module being adapted to display a hierarchical chart, the hierarchical chart including a plurality of nodes, each of the nodes corresponding to a group and displaying entities associated with the group, receiving a selection of at least one node in the hierarchical chart, and displaying nodes in the hierarchical chart related to the at least one node, wherein the related nodes are configured to provide a selection menu of actions that are uniquely associated with at least one node, wherein the actions include updating the nodes that are being displayed; and a user input module for receiving user input, wherein the user input includes selecting one or more nodes from the updated nodes being displayed, and wherein the user input further includes designating one or more related nodes to the one or more selected nodes, process the user input; and the display module to display the one or more selected nodes and the one or more related nodes as a separate hierarchal chart.

15. The system of claim 14 wherein the database is stored in the memory.

16. The system of claim 14 further comprising a network interface, the database being accessible to the system using the network interface.

17. The system of claim 14 wherein the user input module comprises a keyboard and a pointing device.

18. The system of claim 14 wherein the processor is configured to determine a hierarchical relationship among the groups.

19. The system of claim 14 wherein the entities displayed on the nodes are selectable by user input.

20. The system of claim 14 wherein each node includes an action being associated with the group.

* * * * *

UNITED STATES PATENT AND TRADEMARK OFFICE
CERTIFICATE OF CORRECTION

| | | |
|---|---|---|
| PATENT NO. | : 8,806,379 B2 | Page 1 of 1 |
| APPLICATION NO. | : 12/563082 | |
| DATED | : August 12, 2014 | |
| INVENTOR(S) | : Chen et al. | |

It is certified that error appears in the above-identified patent and that said Letters Patent is hereby corrected as shown below:

Title Page, References Cited

On page 3, column 1, under Other Publications, line 18, delete "Qiuxa" and insert -- Quixa --, therefor.

In the Specification

In column 5, lines 44-45, delete "The operations......displayed." and insert the same on Col. 5, Line 43, after "etc." as the continuation of the same paragraph.

In column 7, line 9, delete "the to" and insert -- to the --, therefor.

Signed and Sealed this
Seventeenth Day of March, 2015

Michelle K. Lee
*Director of the United States Patent and Trademark Office*